(12) United States Patent
Pomish et al.

(10) Patent No.: US 11,260,912 B2
(45) Date of Patent: Mar. 1, 2022

(54) VEHICLE BODY PANELS AND SYSTEMS HAVING EMBEDDED SENSOR OPTIONS

(71) Applicant: TOYOTA MOTOR ENGINEERING & MANUFACTURING NORTH AMERICA, INC., Plano, TX (US)

(72) Inventors: Ethan W. Pomish, Livonia, MI (US); Shardul S. Panwar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 328 days.

(21) Appl. No.: 16/593,286

(22) Filed: Oct. 4, 2019

(65) Prior Publication Data

US 2021/0101642 A1 Apr. 8, 2021

(51) Int. Cl.
*B62D 25/00* (2006.01)
*B62D 25/02* (2006.01)
*G01D 11/30* (2006.01)
*G01D 11/24* (2006.01)
*B60R 19/48* (2006.01)
*G01S 13/931* (2020.01)

(52) U.S. Cl.
CPC ........... *B62D 25/02* (2013.01); *G01D 11/245* (2013.01); *G01D 11/305* (2013.01); *B60R 19/483* (2013.01); *G01S 13/931* (2013.01); *G01S 2013/93274* (2020.01)

(58) Field of Classification Search
CPC .... B62D 25/02; G01D 11/245; G01D 11/305; G01S 13/931
See application file for complete search history.

(56) References Cited

U.S. PATENT DOCUMENTS

| 6,203,366 | B1 | 3/2001 | Muller et al. |
| 9,004,578 | B1 | 4/2015 | Ghannam et al. |
| 10,150,527 | B2 * | 12/2018 | Salvaggio, Jr. ........ F21V 23/002 |
| 10,173,623 | B1 | 1/2019 | Meksavan et al. |
| 2004/0189054 | A1 | 9/2004 | Chernoff et al. |
| 2005/0242933 | A1 | 11/2005 | Loh |
| 2008/0099665 | A1 * | 5/2008 | Baudon ............... B60R 13/0275 250/221 |

(Continued)

FOREIGN PATENT DOCUMENTS

WO 2018237033 12/2018

*Primary Examiner* — Jamel E Williams
(74) *Attorney, Agent, or Firm* — Dinsmore & Shohl LLP

(57) ABSTRACT

Vehicle body panels and systems are described. A vehicle body panel may include at least one layer of material defining the vehicle body panel and one or more than one electronic device, where a portion of each electronic device is embedded within one or more than one of the at least one layer of material. Each electronic device may communicate with a control system or a vehicle control unit of the vehicle to support an advanced-feature functionality of the vehicle. At least one electronic device may include a first portion embedded within the one or more than one of the at least one layer of material. The first portion may be couplable to a second portion, not embedded within the material, where the first portion upon being coupled to the second portion communicates with the control system or the vehicle control unit of the vehicle to support the advanced-feature functionality.

20 Claims, 6 Drawing Sheets

(56) References Cited

U.S. PATENT DOCUMENTS

2011/0169251 A1* 7/2011 Arndt .................. B60R 19/483
 280/735
2018/0090868 A1 3/2018 Forwerck

* cited by examiner

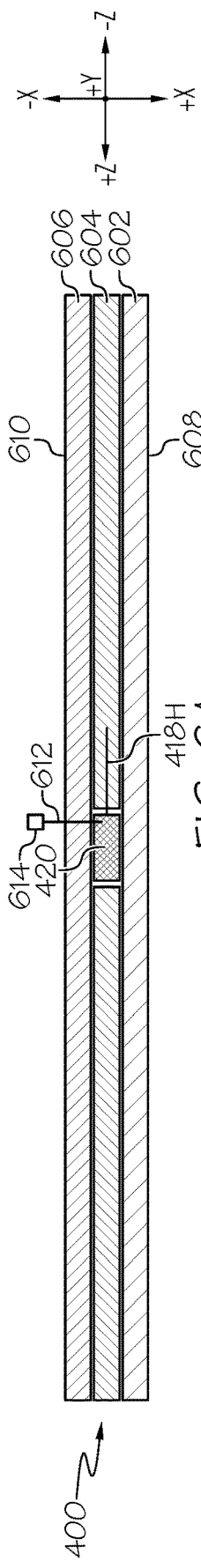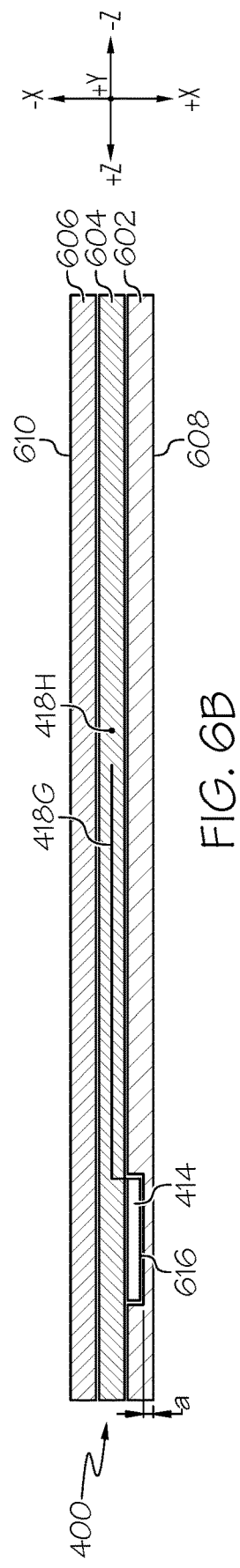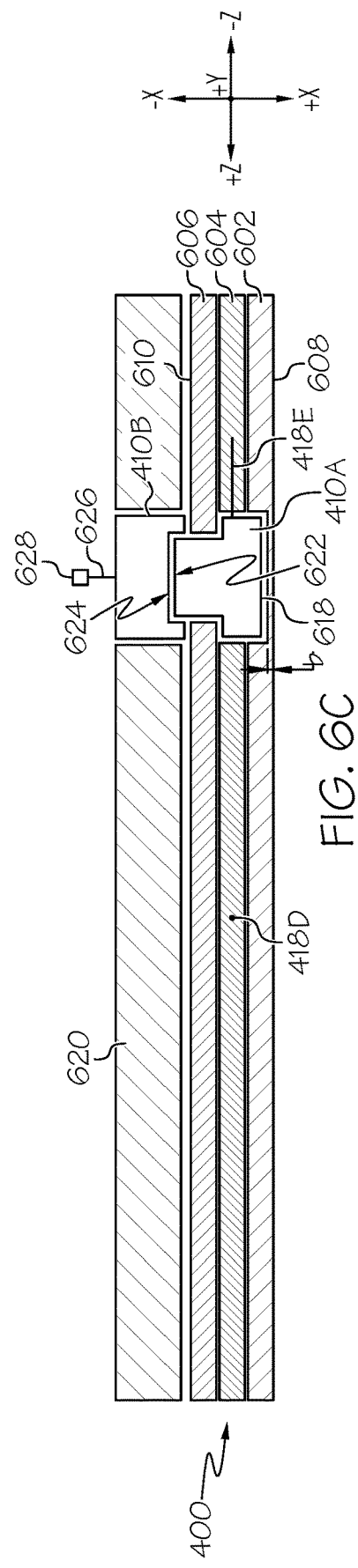

VEHICLE BODY PANELS AND SYSTEMS HAVING EMBEDDED SENSOR OPTIONS

BACKGROUND

Field

The present disclosure generally relates to a vehicle body panel, and more specifically, to a vehicle body panel that includes at least one sensor embedded therein, the vehicle body panel configured for installation on the different trim levels of a particular vehicle make and model, different vehicle models of the same vehicle make, or any vehicle make, model and/or trim level.

Technical Background

Vehicles may be manufactured with various packages and/or trim levels. Certain packages and/or trim levels have additional electronic devices that are not present in other packages and/or trim levels. Currently, customers do not have an option to upgrade to these additional electronic devices after a certain package and/or trim level is selected.

SUMMARY

In one aspect, a vehicle body panel may include: at least one layer of material defining the vehicle body panel, and one or more than one electronic device, where a portion of each electronic device is embedded within one or more than one of the at least one layer of material. Each electronic device may communicate with a control system or a vehicle control unit of the vehicle to support an advanced-feature functionality of the vehicle. At least one electronic device may include a first portion embedded within the one or more than one of the at least one layer of material. The first portion may be couplable to a second portion, not embedded within the material, where the first portion upon being coupled to the second portion communicates with the control system or the vehicle control unit of the vehicle to support the advanced-feature functionality of the vehicle.

In another aspect, a vehicle body panel system may include: one or more than one control system, each control system supporting an advanced-feature functionality of a vehicle, at least one layer of material defining a vehicle body panel, and one or more than one electronic device, where a portion of each electronic device is embedded within one or more than one of the at least one layer of material. Each electronic device may communicate with the one or more than one control system to support at least one advanced-feature functionality of the vehicle. At least one electronic device may include a first portion embedded within the one or more than one of the at least one layer of material. The first portion may be couplable to a second portion, not embedded within the material, where the first portion upon being coupled to the second portion communicates with the one or more than one control system to support the at least one advanced-feature functionality of the vehicle.

In a further aspect, a vehicle body panel system may include: a vehicle control unit supporting an advanced-feature functionality of a vehicle, at least one layer of material defining a vehicle body panel, and one or more than one electronic device, where a portion of each electronic device is embedded within one or more than one of the at least one layer of material. Each electronic device may communicate with the vehicle control unit to support at least one advanced-feature functionality of the vehicle. At least one electronic device may include a first portion embedded within the one or more than one of the at least one layer of material. The first portion may be couplable to a second portion, not embedded within the material, where the first portion upon being coupled to the second portion communicates with the vehicle control unit to support the at least one advanced-feature functionality of the vehicle.

Additional features and advantages of the aspects described herein will be set forth in the detailed description which follows, and in part will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 6A depicts a first cross-sectional view of the illustrative vehicle body panel of FIG. 4, according to one or more embodiments shown and described herein;

FIG. 6B depicts a second cross-sectional view of the illustrative vehicle body panel of FIG. 4, according to one or more embodiments shown and described herein; and FIG. 6C depicts a third cross-sectional view of the illustrative vehicle body panel of FIG. 4, according to one or more embodiments shown and described herein.

DETAILED DESCRIPTION

Figure 1:
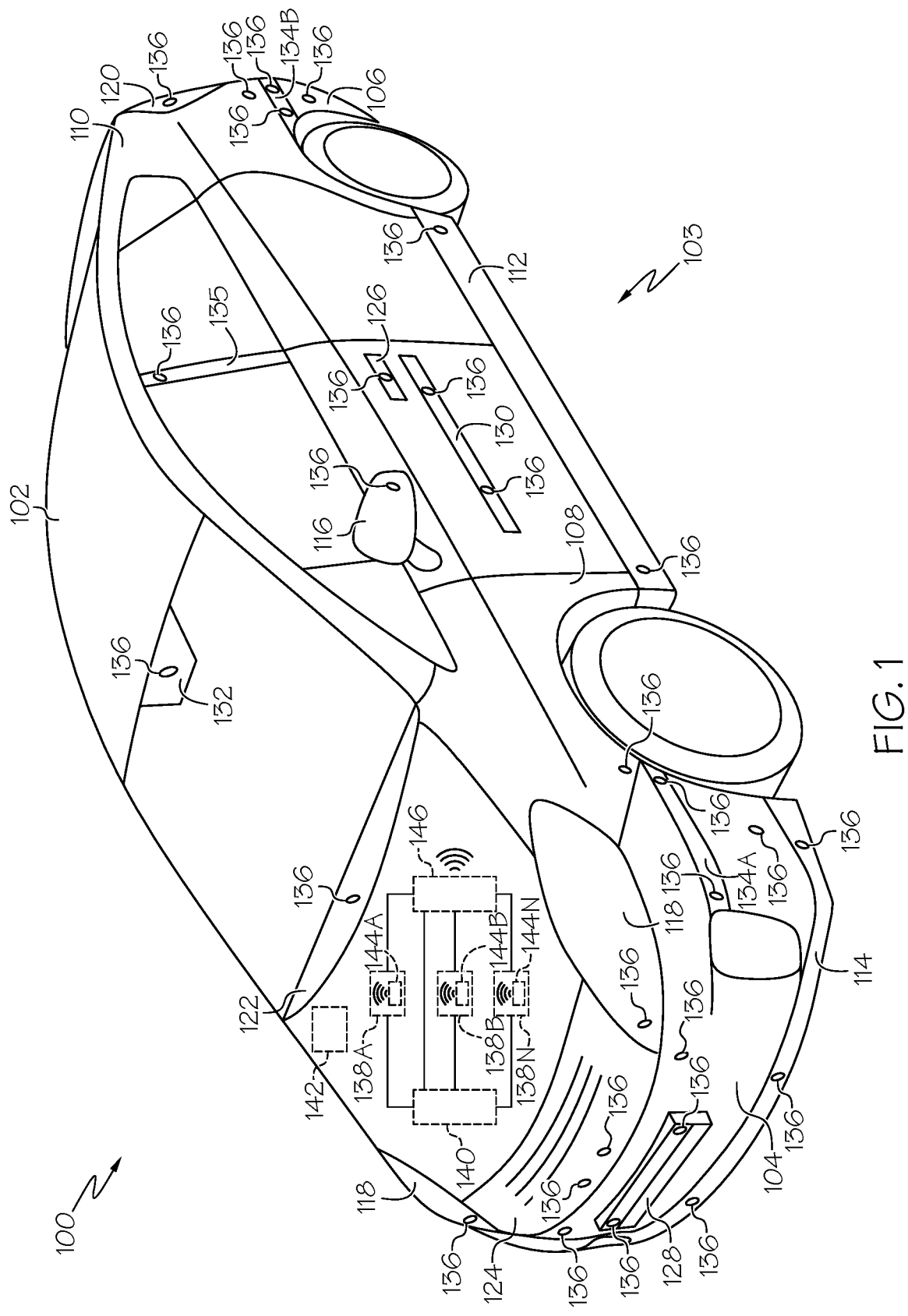
FIG. 1 depicts an illustrative system including a vehicle having a plurality of body panels including a plurality of electronic devices, according to one or more embodiments shown and described herein.

Reference will now be made in detail to various vehicle body panels of the present disclosure. Each vehicle body panel may include at least one electronic device (e.g., a sensor, a camera, and/or the like), or a portion thereof, embedded therein. According to various aspects, a vehicle body panel may include a universal body panel configured to be interchangeable with an original equipment manufacturer (OEM) body panel of multiple trim levels of a particular vehicle make and model, multiple vehicle models of a same vehicle make, or any vehicle make, model and/or trim level combination. In some aspects, the vehicle body panel of the present disclosure may replace an OEM body panel that originally included the at least one electronic device (e.g., if the OEM body panel is damaged, one or more than one of the at least one electronic device is defective, and/or the like). In other aspects, the vehicle body panel of the present disclosure may replace an OEM body panel that did not originally include the at least one electronic device (e.g., to upgrade the OEM body panel to a vehicle body panel that includes one or more than one of the at least one electronic device). Accordingly, the vehicle body panel of the present disclosure, configured to be interchangeable with an OEM body panel, may include and/or exclude electronic devices and/or have a different electronic device configuration than the OEM body panel. Similarly, a first vehicle body panel may include a first electronic device configuration and/or a first set of electronic devices while a second vehicle body panel, configured to be interchangeable with the first vehicle body panel, may include a second electronic device configuration and/or a second set of electronic devices different than the first vehicle body panel.

Advanced-feature functionalities (e.g., pre-collision avoidance, lane departure alerts, automatic high beams, dynamic radar cruise control, road sign assist, lane tracing assist, and/or the like) and their supporting electronic devices (e.g., a sensor(s), a camera(s), and/or the like) may only be offered for purchase and/or available for purchase with certain packages (e.g., certain technology packages) and/or certain trim levels (e.g., an Executive Luxury Edition (XLE) trim, an Executive Sport Edition (XSE) trim, a Luxury Grade (Limited) trim, and/or the like). A vehicle sold with such a package and/or such a trim level is originally manufactured with not only particular wiring to power the electronic devices and a control system(s) to respond to signals received from the electronic devices, but also a body panel customized for the particular make and/or model of the vehicle and configured to house the electronic devices at particular locations as required by each advanced-feature functionality. Accordingly, a vehicle owner that has purchased a vehicle (e.g., as an original purchaser, as a subsequent purchaser) without such a package and/or with a different trim level (e.g., an Entry Level Grade (L) trim, a Luxury Edition (LE) trim, a Sport (S) trim, a Sport Edition (SE) trim, and/or the like) does not have the option to subsequently upgrade their vehicle to include such advanced-feature functionalities. For example, the particular wiring and control system(s) as well as the customized body panels are not present to support the electronic devices (e.g., sensor(s), camera(s), and/or the like). Accordingly, a system including a body panel having an electronic device(s) (e.g., sensor(s), camera(s), and/or the like) embedded therein is desirable to support advanced-feature functionalities, irrespective of a vehicle's make or model, the vehicle's original purchase package(s) and/or the vehicle's original trim level.

According to various aspects, the vehicle body panel of the present disclosure may be configured for initial installation as well as for selective repositioning along a vehicle's body. In some aspects, the vehicle body panel of the present disclosure may be selectively repositioned by decoupling and recoupling the vehicle body panel to the vehicle's body. Such an approach may selectively reposition the at least one electronic device embedded within the vehicle body panel. Various vehicle body panels are illustrated in the accompanying drawings. Whenever possible, the same reference numerals will be used throughout the drawings to refer to the same or like parts.

Since a vehicle body panel, as described herein, may be interchangeable amongst a number of vehicles (e.g., multiple trim levels of a particular vehicle make and model, multiple vehicle models of a same vehicle make, or any vehicle make, model and/or trim level combination), the vehicle body panel of the present disclosure may effectively reduce costs (e.g., production costs, inventory costs, and/or the like) while increasing the ability of a vehicle owner to add electronic devices to and/or replace existing electronic devices on their vehicle. In some aspects, the vehicle body panel described herein may include a certain electronic device(s) and/or exclude a certain electronic device(s). According to various aspects, a certain electronic device(s) may be excluded from a vehicle body panel to further reduce costs (e.g., less electronic devices to manufacture, less electronic devices in inventory, and/or the like). According to further aspects, certain electronic device(s) may be included with a vehicle body panel to support a particular advanced-feature functionality. In such an example, a vehicle owner (e.g., to upgrade their vehicle to include that particular advanced-feature functionality) may couple a vehicle body panel(s) to their vehicle, where the vehicle body panel(s) include the certain electronic device(s) that support that particular advanced-feature functionality. According to yet further aspects, the vehicle body panel described herein may include certain electronic device(s) (e.g., electronic device(s) that support one or more than one particular advanced-feature functionality) and may exclude certain electronic device(s) (e.g., expensive electronic device(s) to lower entry costs for vehicle owners wishing to upgrade). In such aspects, the vehicle body panel described herein may be configured such that an excluded electronic device(s) (e.g., if pre-existing on the vehicle owner's vehicle) is mountable to the vehicle body panel.

FIG. 1 depicts an illustrative system 100 including a vehicle 102 having a plurality of vehicle body panels 103 including a plurality of electronic devices 136, according to various aspects of the present disclosure. Referring to FIG. 1, the plurality of vehicle body panels 103 may include a first style of vehicle body panel including a front bumper cover 104, a rear bumper cover 106, a front fender 108, a rear quarter panel 110, a rocker panel 112, an air dam 114, and/or the like. According to various aspects described herein, the first style of vehicle body panel may be configured for installation and/or interchangeability on different trim levels of a particular vehicle make and model. Further referring to FIG. 1, the plurality of vehicle body panels 103 may include a second style of vehicle body panel including a side mirror housing 116, a headlight assembly 118, a taillight assembly 120, a windshield cowl 122, a grille 124, a door handle 126, and/or the like. According to various aspects described herein, the second style of vehicle body panel may be configured for installation and/or interchangeability on different vehicle models of the same vehicle make and/or different vehicle models of a different vehicle make. Yet further, referring to FIG. 1, the plurality of vehicle body panels 103 may include a third style of vehicle body panel including a license plate mount 128, a body side molding 130, a windshield assembly 132, a body panel add-on 134A, 134B, a pillar (e.g. b-pillar) trim piece 135, and/or the like. According to various aspects described herein, the third style of vehicle body panel may be configured for universal installation and/or interchangeability on any vehicle make, model and/or trim level. As described herein, each vehicle body panel 103 may include one or more than one electronic device 136 to realize one or more than one advanced-feature functionality. In view of FIG. 1, according to various aspects, each of the plurality of vehicle body panels 103 (e.g., of the first style, of the second style, and/or of the third style) may be a metal and/or a non-metal vehicle body panel 103.

Still referring to FIG. 1, each of the plurality of electronic devices 136 of the vehicle 102 may be communicatively coupled (e.g., via a wired and/or wireless connection, as described herein) with one or more than one control system 138A, 138B, 138N of the vehicle 102 (e.g., if equipped) or with a vehicle control unit 140 of the vehicle 102. According to various aspects, each control system 138A, 138B, 138N may be associated with a respective advanced-feature functionality of the vehicle 102. In some aspects, the one or more than one control system 138A, 138B, 138N may be an add-on to the vehicle 102 to support one or more than one electronic device 136 of a vehicle body panel 103, as described herein, such that various advanced-feature functionalities may be realized. According to aspects described herein, each control system 138A, 138B, 138N may be configured to process signals and/or data received from one or more than one electronic device 136 of the vehicle 102 and/or to communicate the signals and/or data to the vehicle control unit 140. According to various aspects, the vehicle control unit 140 may include a power-train control module (PCM) which includes an engine control unit (ECU) and a transmission control unit (TCU). The vehicle control unit 140 and the one or more than one control system 138A, 138B, 138N may be electrically coupled (not shown) to a power supply 142 (e.g., battery).

In some aspects, each control system 138A, 138B, 138N may include a respective wireless node 144A, 144B, 144N configured to receive signals and/or data from one or more than one electronic device 136 and/or to transmit signals and/or data to one or more than one electronic device 136. In other aspects (e.g., if each control system 138A, 138B, 138N does not include a respective wireless node 144A, 144B, 144N), each control system 138A, 138B, 138N may be coupled to a central wireless node 146. The central wireless node 146 may be electrically coupled (not shown) to the power supply 142 (e.g., battery). In such aspects, the central wireless node 146 may be configured to receive signals and/or data from one or more than one electronic device 136 and/or to transmit signals and/or data to one or more than one electronic device 136 (e.g., on behalf of one or more than one control system 138A, 138B, 138N). The central wireless node 146 may be further configured to distribute communications to the one or more than one control system 138A, 138B, 138N and/or the vehicle control unit 140 for processing and/or to receive communications from the one or more than one control system 138A, 138B, 138N and/or the vehicle control unit 140 for transmission to the one or more than one electronic device 136. According to some aspects, the central wireless node 146 may be pre-installed on the vehicle 102. In one aspect, the central wireless node 146 may integrated within the vehicle control unit 140. According to other aspects, the central wireless node 146 may be an add-on to the vehicle 102 to support one or more than one electronic device 136 of a vehicle body panel 103, as described herein, such that various advanced-feature functionalities may be realized. Accordingly, a vehicle 102 not originally equipped with and/or pre-wired for one or more than one electronic device 136 may nonetheless be upgraded to realize various advanced-feature functionalities as described herein. In such aspects, the one or more than one control system 138A, 138B, 138N and/or the vehicle control unit 140 may be reconfigured and/or updated (e.g., via programming and/or the like) to support one or more than one electronic device 136 added, upgraded, and/or removed via a vehicle body panel 103 as described herein. In some aspects, the one or more than one control system 138A, 138B, 138N and/or the vehicle control unit 140 may be configured to automatically recognize and adapt to the addition, upgrade, and/or removal of one or more than one electronic device 136 without a particular reconfiguration and/or update (e.g., plug and play electronic devices 136).

Such an update or adaptation may permit the one or more than one control system 138A, 138B, 138N and/or the vehicle control unit 140 to communicate with a vehicle user interface (e.g., dash display, a head unit, sound system, alarm system, and/or the like) and/or a vehicle system (e.g., headlight system, braking system, cruise control system, and/or the like) to realize the advanced-feature functionalities described herein on the vehicle owner's vehicle.

According to various aspects, a control system 138A, 138B, and/or 138N may operate in conjunction with the vehicle control unit 140 to generate a control signal associated with an advanced-feature functionality of the vehicle 102. In such aspects, the vehicle control unit 140 may be configured to process signals and/or data received from one or more than one control system 138A, 138B, 138N and to generate a feedback signal for each respective control system 138A, 138B, 138N. Each respective control system 138A, 138B, 138N may be configured to generate the control signal associated with the advanced-feature functionality based on the feedback signal generated by the vehicle control unit 140. As described, each control signal may control one or more vehicle user interface and/or one or more vehicle system to realize the advanced-feature functionalities on the vehicle owner's vehicle.

According to other aspects, a control system 138A, 138B, and/or 138N may operate independent of the vehicle control unit 140. In such aspects, each control system 138A, 138B, 138N may be configured to process signals and/or data received from one or more than one electronic device 136 of the vehicle 102 and to generate the control signal associated with the advanced-feature functionality. In such aspects, each control system 138A, 138B, 138N may be configured to communicate the generated control signal to the vehicle control unit 140 for use in generating a feedback signal for another control systems 138A, 138B, 138N. As described, each control signal may control one or more vehicle user interface and/or one or more vehicle system to realize the advanced-feature functionalities on the vehicle owner's vehicle.

Figure 2:
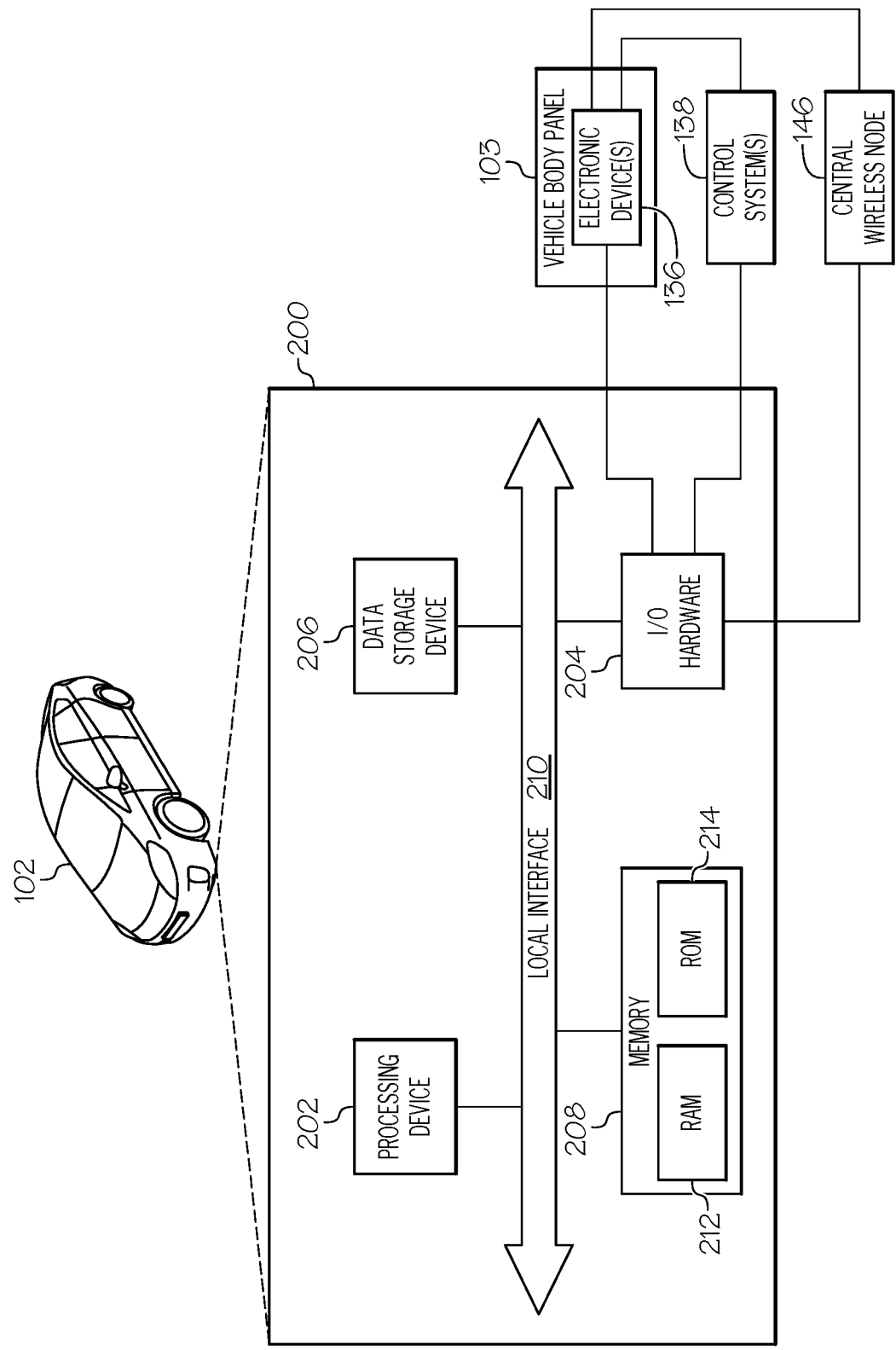
FIG. 2 schematically depicts a block diagram of illustrative hardware components of a vehicle control unit of the vehicle that may communicate with one or more than one electronic device of a vehicle body panel to realize one or more than one advanced-feature functionality, according to one or more embodiments shown and described herein.

FIG. 2 schematically depicts a block diagram of illustrative hardware components of the vehicle control unit 140 of the vehicle 102 that may communicate with one or more than one electronic device 136 of a vehicle body panel 103, as described herein, to realize one or more than one advanced-feature functionality, as described herein.

The vehicle 102 may include a first component 200. The first component 200 may realize communications and/or functionalities, according to aspects shown and described herein, via hardware, software, and/or firmware. According to various aspects, the first component 200 may be configured as a special purpose computer (e.g., a particular machine) designed specifically for performing the communications and/or functionalities described herein. Referring to FIG. 2, the first component 200 may include an onboard vehicle computing system (e.g., vehicle control unit 140). In some aspects, the first component 200 may be a plurality of vehicle computing systems. As discussed herein, the first component 200 may be configured to communicate with one or more than one electronic device 136 (e.g., sensors) of one or more than one vehicle body panel 103 of the present disclosure and to process electronic device data to realize one or more than one advanced-feature functionality of the vehicle 102.

Referring to FIG. 2, the first component 200 may include a processing device 202, I/O hardware 204, a data storage device 206, and a non-transitory memory component 208. A local interface 210, such as a bus or the like, may interconnect the various components. As discussed herein, one or more than one electronic device 136 (e.g., one or more than one advanced-feature functionality sensor) may be coupled (e.g., pre-wired) directly to the local interface 210 of the first component 200 and/or one or more than one electronic device 136 may be coupled indirectly (e.g., via I/O hardware 204) to the local interface 210 of the first component. In view of FIG. 2, one or more than one electronic device 136 may be coupled, via a wired and/or wireless connection, to a control system 138 that is coupled to the local interface 210. Further in view of FIG. 2, one or more than one electronic device 136 may be wirelessly coupled to a central wireless node 146 that is coupled to the local interface 210. The central wireless node 146 may include any wireless networking hardware for providing a wireless communication link (e.g., LAN, Bluetooth, and/or the like) for the one or more than one electronic device 136. Each electronic device 136, as described more fully herein, may be embedded within a vehicle body panel 103 that is couplable to the vehicle 102.

The processing device 202, such as a computer processing unit (CPU), may be the central processing unit of the first component 200, performing calculations and logic operations to execute a program. The processing device 202, alone or in conjunction with the other components, is an illustrative processing device, computing device, processor, or combination thereof. The processing device 202 may include any processing component configured to receive and execute instructions (such as from the data storage device 206 and/or the memory component 208).

The memory component 208 may be configured as a volatile and/or a nonvolatile computer-readable medium and, as such, may include random access memory 212 (including SRAM, DRAM, and/or other types of random access memory), read only memory (ROM) 214, flash memory, registers, compact discs (CD), digital versatile discs (DVD), and/or other types of storage components. The memory component 208 may include one or more programming instructions thereon that, when executed by the processing device 202, cause the processing device 202 to communicate with one or more than one electronic device 136 of a vehicle body panel 103, as described herein, to realize one or more than one advanced-feature functionality, as described herein. The one or more programming instructions stored on the memory component 208 may be embodied as a plurality of software logic modules.

Still referring to FIG. 2, the data storage device 206, which may generally be a storage medium, may contain one or more data repositories for storing data that is received (e.g., electronic device 136 data, and/or the like) and/or generated (e.g., a control signal associated with an advanced-feature functionality of the vehicle 102, and/or the like). The data storage device 206 may be any physical storage medium, including, but not limited to, a hard disk drive (HDD), memory, removable storage, and/or the like.

Still referring to FIG. 2, the I/O hardware 204 may communicate information between the local interface 210 and one or more other components of the vehicle 102. In some aspects, the I/O hardware 204 may act as an interface between the first component 200 and other components (e.g., the electronic devices 136 of a vehicle body panel 103, the control systems 138, the central wireless node 146, and/or the like). In other aspects, the other components (e.g., the electronic devices 136 of a vehicle body panel 103, the control systems 138, the central wireless node 146, and/or the like) may be coupled directly to the local interface 210. As discussed herein, such other components may include OEM installed components, replacement components and/or upgrade components (e.g., add-ons). According to various aspects, the I/O hardware 204 may be utilized to transmit one or more control signals to further components of the vehicle 102 to realize one or more advanced-feature functionality as described herein.

Figure 3:
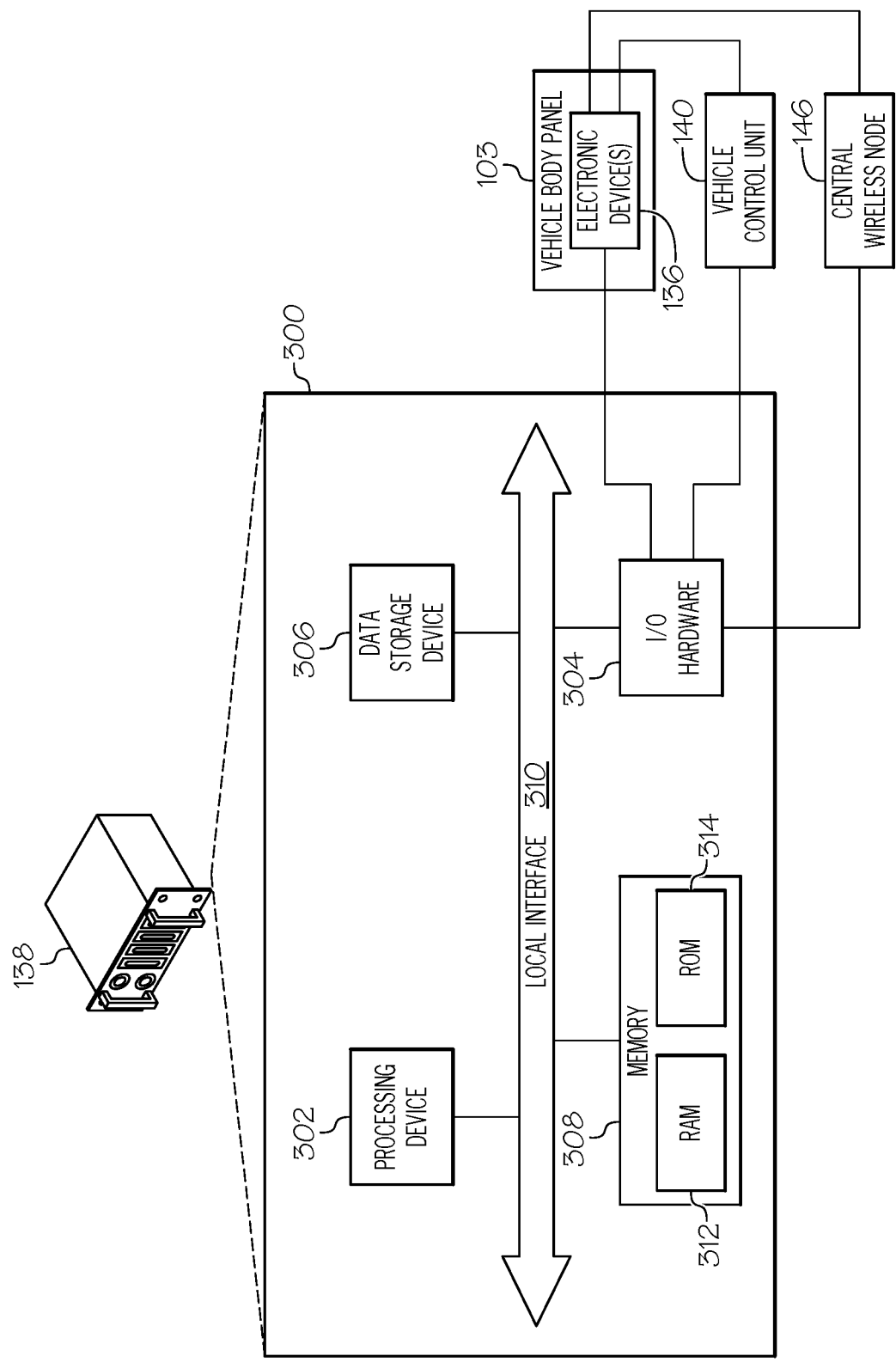
FIG. 3 schematically depicts a block diagram of illustrative hardware components of a control system that may communicate with one or more than one electronic device of a vehicle body panel to realize one or more than one advanced-feature functionality, according to one or more embodiments shown and described herein.

FIG. 3 schematically depicts a block diagram of illustrative hardware components of a control system 138 (e.g., control system 138A, 138B, and/or 138N of FIG. 1) that may communicate with one or more than one electronic device 136 of a vehicle body panel 103, as described herein, to realize one or more than one advanced-feature functionality, as described herein. The control system 138 may realize communications and/or functionalities, according to aspects shown and described herein, via hardware, software, and/or firmware. According to various aspects, the control system 138 may be configured as a special purpose computer (e.g., a particular machine) designed specifically for performing the communications and/or functionalities described herein. In particular, the control system 138 may be configured to communicate with one or more than one electronic device 136 (e.g., sensors) of one or more than one vehicle body panel 103 of the present disclosure and to process electronic device data to realize one or more than one advanced-feature functionality of the vehicle 102.

Referring to FIG. 3, the control system 138 may include a processing device 302, I/O hardware 304, a data storage device 306, and a non-transitory memory component 308. A local interface 310, such as a bus or the like, may interconnect the various components. As discussed herein, one or more than one electronic device 136 (e.g., one or more than one advanced-feature functionality sensor) may be coupled (e.g., pre-wired) directly to the local interface 310 of the control system 138 and/or one or more than one electronic device 136 may be coupled indirectly (e.g., via I/O hardware 304) to the local interface 310 of the control system 138. In view of FIG. 3, one or more than one electronic device 136 may be wired to a vehicle control unit 140 that is coupled to the local interface 310. Further in view of FIG. 3, one or more than one electronic device 136 may be wirelessly coupled to a central wireless node 146 that is coupled to the local interface 310. As described herein, the central wireless node 146 may include any wireless networking hardware for providing a wireless communication link (e.g., LAN, Bluetooth, and/or the like) for the one or more than one electronic device 136. Each electronic device 136, as described more fully herein, may be embedded within a vehicle body panel 103 that is couplable to the vehicle 102.

The processing device 302, such as a computer processing unit (CPU), may be the central processing unit of the control system 138, performing calculations and logic operations to execute a program. The processing device 302, alone or in conjunction with the other components, is an illustrative processing device, computing device, processor, or combination thereof. The processing device 302 may include any processing component configured to receive and execute instructions (such as from the data storage device 306 and/or the memory component 308).

The memory component 308 may be configured as a volatile and/or a nonvolatile computer-readable medium and, as such, may include random access memory 312 (including SRAM, DRAM, and/or other types of random access memory), read only memory (ROM) 314, flash memory, registers, compact discs (CD), digital versatile discs (DVD), and/or other types of storage components. The memory component 308 may include one or more programming instructions thereon that, when executed by the processing device 302, cause the processing device 302 to communicate with one or more than one electronic device 136 of a vehicle body panel 103, as described herein, to realize one or more than one advanced-feature functionality, as described herein. The one or more programming instructions stored on the memory component 308 may be embodied as a plurality of software logic modules.

Still referring to FIG. 3, the data storage device 306, which may generally be a storage medium, may contain one or more data repositories for storing data that is received (e.g., electronic device 136 data, and/or the like) and/or generated (e.g., a control signal associated with an advanced-feature functionality of the vehicle 102, and/or the like). The data storage device 306 may be any physical storage medium, including, but not limited to, a hard disk drive (HDD), memory, removable storage, and/or the like.

Still referring to FIG. 3, the I/O hardware 304 may communicate information between the local interface 310 and one or more other components of the vehicle 102. In some aspects, the I/O hardware 304 may act as an interface between the control system 138 and other components (e.g., the electronic devices 136 of a vehicle body panel 103, the vehicle control unit 140, the central wireless node 146, and/or the like). In other aspects, the other components (e.g., the electronic devices 136 of a vehicle body panel 103, the vehicle control unit 140, the central wireless node 146, and/or the like) may be coupled directly to the local interface 310. As discussed herein, such other components may include OEM installed components, replacement components, and/or upgrade components (e.g., add-ons). According to various aspects, the I/O hardware 304 may be utilized to transmit one or more control signals to further components of the vehicle 102 to realize one or more advanced-feature functionality as described herein.

Figure 4:
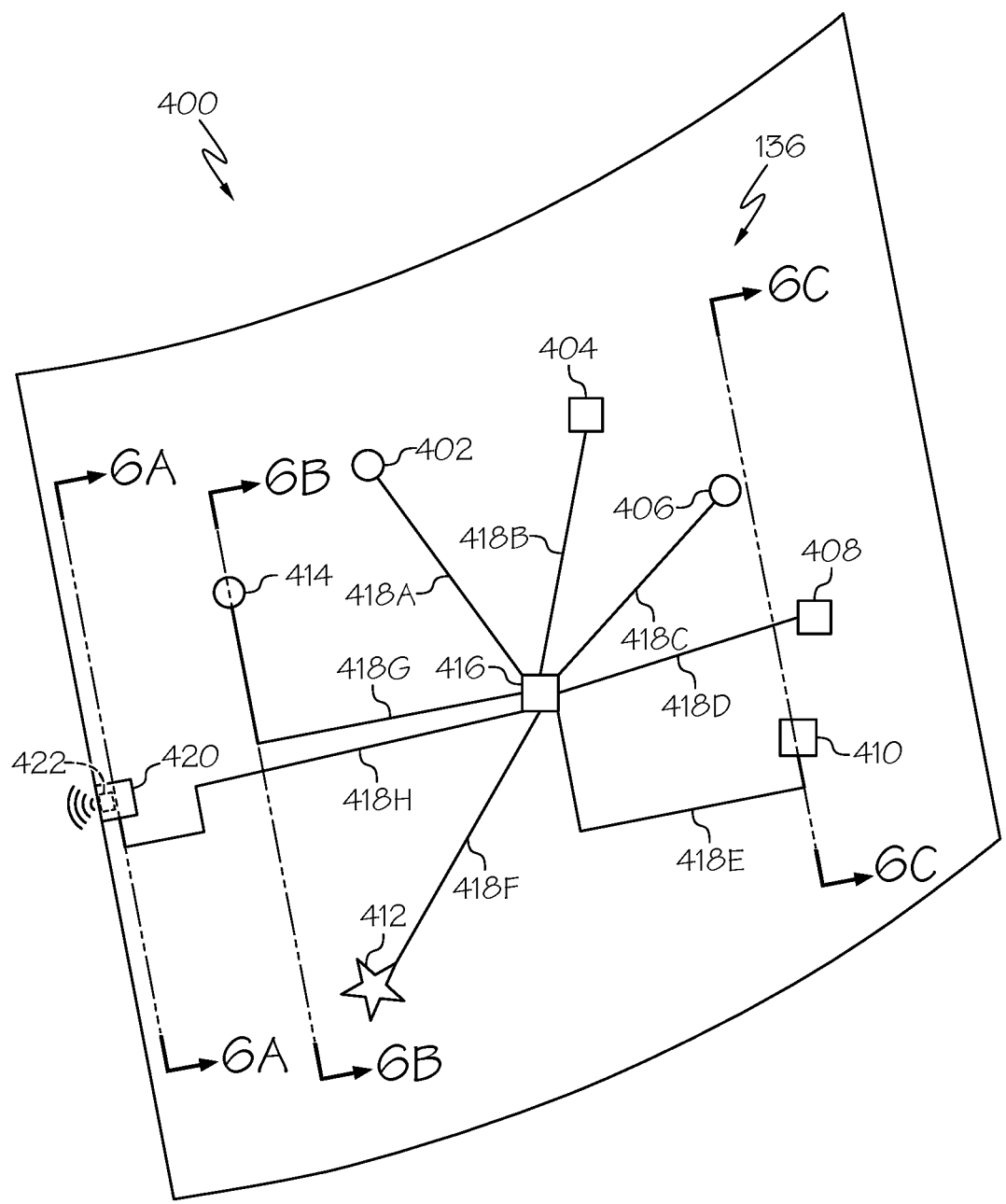
FIG. 4 depicts an illustrative vehicle body panel including a plurality of electronic devices, according to one or more embodiments shown and described herein.

FIG. 4 depicts an illustrative vehicle body panel 400 including a plurality of electronic devices 136, according to various aspects of the present disclosure. Referring to FIG. 4, the plurality of electronic devices 136 may include a laser light emitter 402, a photodetector and receiver 404, a radio wave transmitter 406, a radio wave receiver 408, a camera 410 including an image sensor (e.g., a complementary metal-oxide-semiconductor (CMOS) sensor), a microwave receiver 412, an ultrasound emitter and receiver 414, and/or the like. Furthermore, in view of FIG. 4, each of the plurality of electronic devices 136 of the vehicle body panel 400 may be coupled to a local node 416 (e.g., a central processing unit (CPU)) via a respective connector line (e.g., connector lines 418A-418G). According to various aspects, each connector line may include one or more than one electrically conductive wire, one or more than one fiber-optic cable, and/or the like. According to other aspects, each of the plurality of electronic devices 136 of the vehicle body panel 400 may be wirelessly coupled to the local node 416. The node 416 may be configured to process signals and/or data received via each connector line (e.g., connector lines 418A-418G) and/or to communicate the signals and/or data to one or more than one control system (e.g., FIG. 1, control system 138A, 138B, 138N, and/or the like) and/or the vehicle control unit 140. In one example, the node 416 may process signals and/or data received via connector line 418A from the laser light emitter 402 and/or via connector line 418B from the photodetector and receiver 404 and to communicate the signals and/or the data to a LiDAR (Light Detection and Ranging) control system. In another example, the node 416 may process signals and/or data received via connector line 418C from the radio wave transmitter 406 and/or via connector line 418D from the radio wave receiver 408 and to communicate the signals and/or the data to a radar (Radio Detection and Ranging) control system. In a further example, the node 416 may process signals and/or data received via connector line 418G from the ultrasound emitter and receiver 414 and to communicate the signals and/or the data to a park assist control system. In yet another example, the node 416 may process signals and/or data received via connector line 418F from the microwave receiver 412 and to communicate the signals and/or the data to GPS (Global Positioning System) control system.

In view of FIG. 4, the node 416 may be coupled, via connector line 418H, to a power and communication adapter 420 to communicate the signals and/or the data (e.g., received from one or more than one electronic device 136) to the one or more than one control system (e.g., FIG. 1, control system 138A, 138B, 138N, and/or the like) and/or the vehicle control unit 140. Here, although the power and communication adapter 420 is depicted as a single device, the power and communication adapter 420 may, in some aspects, include a separate power adapter and communication adapter. Referring still to FIG. 4, the connector line 418H may similarly include one or more than one electrically conductive wire, one or more than one fiber-optic cable, and/or the like. According to some aspects, if the owner's vehicle (e.g., vehicle unibody, vehicle frame) has been pre-wired to accommodate the one or more than one electronic device 136 of the vehicle body panel 400 the power and communication adapter 420 may be couplable to the pre-wiring to communicate the signals and/or the data to the one or more than one control system (e.g., FIG. 1, control system 138A, 138B, 138N, and/or the like) and/or the vehicle control unit 140. According to other aspects, if the owner's vehicle has not been pre-wired to accommodate the one or more than one electronic device 136 of the vehicle body panel 400, the power and communication adapter 420 may include a wireless sub-node 422. In such aspects, the wireless sub-node 422 may be configured (e.g., transceiver) to wirelessly communicate the signals and/or the data to the one or more than one control system (e.g., FIG. 1, control system 138A, 138B, 138N, and/or the like) and/or the central wireless node 146, as described herein.

According to various aspects, the power and communication adapter 420 may be further configured to power each of the plurality of electronic devices 136. In some aspects, the power and communication adapter 420 may be electrically coupled (not shown, e.g., via a wiring harness and/or the like) to the power supply 142 of the vehicle 102. In other aspects, the power and communication adapter 420 may include a power source or power module independent of the power supply 142. In some aspects, the power and communication adapter 420 may include a battery. In one aspect the battery may include a lithium ion battery. According to various aspects, each electronic device 136 to be powered may be a low-power electronic device (e.g., an electronic device 136 designed to use less power and/or to use power more efficiently than a similar electronic device 136).

In light of FIG. 4, it should be understood that the plurality of electronic devices 136 may further include a capacitive or touch sensor, a proximity sensor, a pressure sensor, a light sensor, a temperature sensor, an infrared sensor, a fingerprint sensor, a fingerprint or image recognition sensor, a fluid sensor, a displacement sensor, a fiber optic sensor, and/or the like to detect or sense physical phenomenon, conditions, stimuli, parameters and/or the like at or near each respective electronic device 136.

Figure 5:
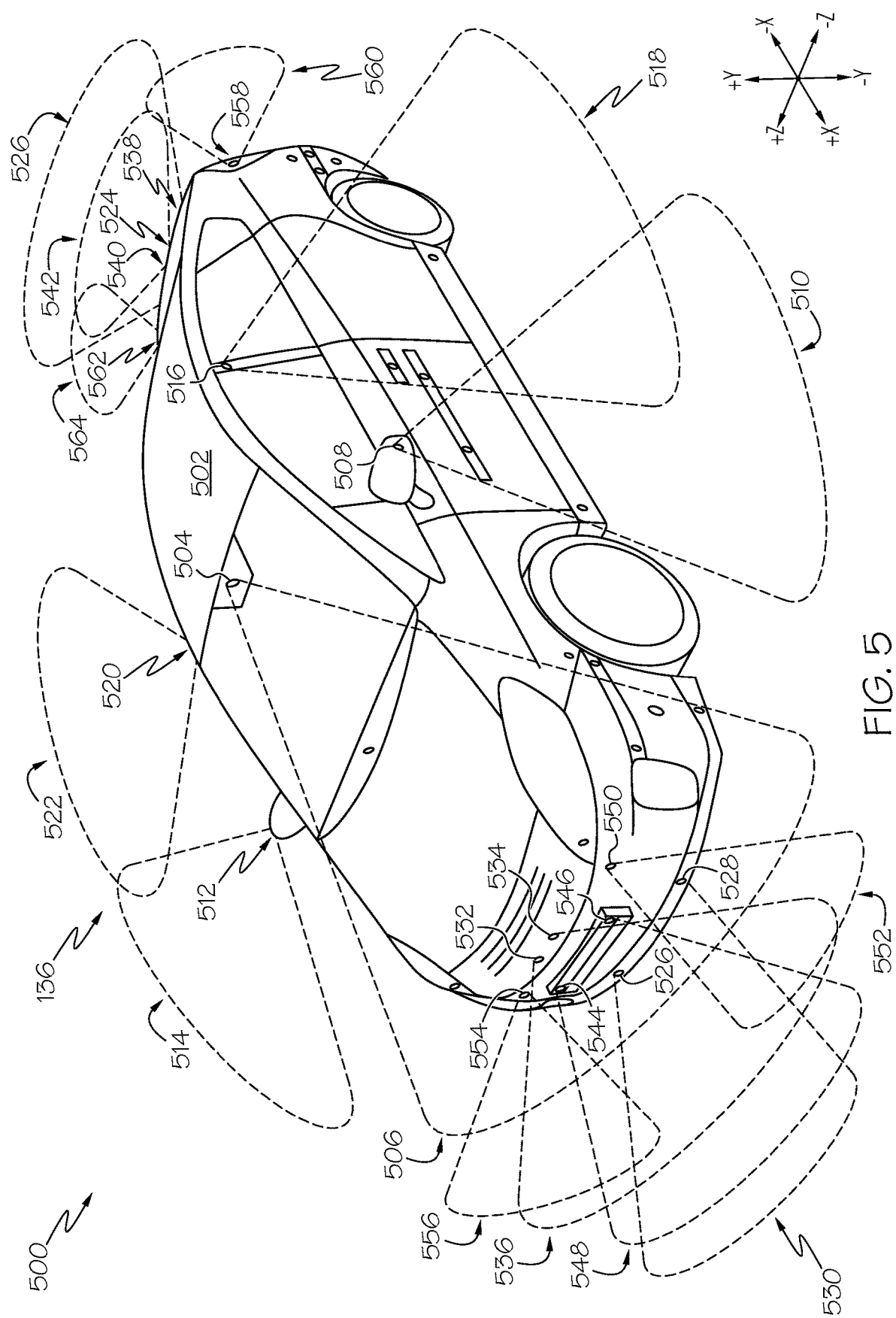
FIG. 5 depicts an illustrative system including a vehicle having a plurality of body panels including a plurality of electronic devices, according to one or more embodiments shown and described herein.

FIG. 5 depicts an illustrative system 500 including a vehicle 502 having a plurality of vehicle body panels 103 including a plurality of electronic devices 136, according to various aspects of the present disclosure. Referring to FIG. 5, a first image sensor 504 may capture a first view 506 (e.g., in the +x direction of the coordinate axes of FIG. 5, toward a front of vehicle 502), a second image sensor 508 may capture a second view 510 (e.g., in the −z direction of the coordinate axes of FIG. 5, toward a driver side of vehicle 502), a third image sensor 512 may capture a third view 514 (e.g., in the +z direction of the coordinate axes of FIG. 5, toward a passenger side of vehicle 502), a fourth image sensor 516 may capture a fourth view 518 (e.g., in the −z direction of the coordinate axes of FIG. 5, toward a driver side of vehicle 502), a fifth image sensor 520 may capture a fifth view 522 (e.g., in the +z direction of the coordinate axes of FIG. 5, toward a passenger side of vehicle 502), and a sixth image sensor 524 may capture a sixth view 526 (e.g., in the −x direction of the coordinate axes of FIG. 5, toward a rear of vehicle 502). According to various aspects, the first image sensor 504 may be associated with a lane departure warning control system, the second image sensor 508, the third image sensor 512, the fourth image sensor 516, the fifth image sensor 520, and/or the sixth image sensor 524 may be associated with a surrounding view control system, and the sixth image sensor 524 (e.g., back-up camera) may be further associated with a park assist control system. Each image sensor 504, 508, 512, 516, 520, 524 may be associated with a camera.

Still referring to FIG. 5, a first radio wave transmitter 527 and/or a first radio wave receiver 528 may define a first long-range radar detection area 530 (e.g., in the +x direction of the coordinate axes of FIG. 5, toward the front of the vehicle 502) and be associated with an adaptive cruise control system. Next, a second radio wave transmitter 532 and a second radio wave receiver 534 may define a second mid-range radar detection area 536 (e.g., in the +x direction of the coordinate axes of FIG. 5, toward the front of the vehicle 502) and be associated with a cross-traffic alert control system. Similarly a third radio wave transmitter 538 and a third radio wave receiver 540 may define a third mid-range radar detection area 542 (e.g., in the −x direction of the coordinate axes of FIG. 5, toward the rear of the vehicle 502) and be associated with a rear collision warning control system. Still further, in view of FIG. 5, a first laser light emitter 544 and a first photodetector and receiver 546, may define a first LiDAR detection area 548 (e.g., in the +x direction of the coordinate axes of FIG. 5, toward the front of the vehicle 502) and be associated with a collision avoidance, an emergency braking, and/or a pedestrian detection control system.

Referring still to FIG. 5, a first ultrasound emitter and receiver 550 may define a first sonar detection area 552 (e.g., in the +x direction of the coordinate axes of FIG. 5, toward a front driver side of the vehicle 502) and a second ultrasound emitter and receiver 554 may define a second sonar detection area 556 (e.g., in the +x direction of the coordinate axes of FIG. 5, toward a front passenger side of the vehicle 502). Similarly, a third ultrasound emitter and receiver 558 may define a third sonar detection area 560 (e.g., in the −x direction of the coordinate axes of FIG. 5, toward a rear driver side of the vehicle 502) and a fourth ultrasound emitter and receiver 562 may define a fourth sonar detection area 564 (e.g., in the −x direction of the coordinate axes of FIG. 5, toward a rear passenger side of the vehicle 502). According to various aspects, the first ultrasound emitter and receiver 550, the second ultrasound emitter and receiver 554, the third ultrasound emitter and receiver 558, and/or the fourth ultrasound emitter and receiver 562 may be associated with a park assist control system.

In light of FIG. 5, a plurality of vehicle body panels 103 including a plurality of electronic devices 136 may support a plurality of vehicle control systems (e.g., control systems 138A, 138B, 138N of FIG. 1 and/or the like) and/or a vehicle control unit 140 that provide a plurality of advanced-feature functionalities. Details (e.g., specific control system algorithms, specific interactions with specific sensors, specific analyses of specific sensor data, and/or the like) associated with each advanced-feature functionality discussed herein (e.g., collision avoidance, lane departure alerts, automatic high beams, dynamic and/or adaptive radar cruise control, road sign assist, lane tracing assist, surrounding view, park assist, cross-traffic alerts, rear collision warnings, emergency braking, pedestrian detection, and/or the like) are beyond the scope of the present disclosure. Aspects of the present disclosure, however, provide a way to install, replace and/or upgrade one or more than one electronic device 136 via one or more than one vehicle body panel 103, as described herein, to realize desired advanced-feature functionalities.

FIG. 6A depicts a cross-sectional view along axis 6A-6A of the illustrative vehicle body panel 400 of FIG. 4, according to various aspects of the present disclosure. Referring to FIG. 6A, the vehicle body panel 400 may be defined by a plurality of layers. As illustrated in FIG. 6A, a first layer 602 having a first thickness may define an external surface 608 (e.g., in the +x direction of the coordinate axes of FIG. 6A) of the vehicle body panel 400, a second layer 604 having a second thickness may define an inner layer of the vehicle body panel 400, and a third layer 606 having a third thickness may define an internal surface 610 (e.g., in the −x direction of the coordinate axes of FIG. 6A) of the vehicle body panel 400. Each of the first layer 602, the second layer 604, and the third layer 606 may be a same material or different materials. According to various aspects, the materials may include, for example, a polymer, a fiberglass, and/or the like. Three layers 602, 604, 606 are discussed herein for ease of description. It should be understood that a vehicle body panel 400, as described herein, may be defined by a plurality of layers equal to, greater than, or less than three layers.

In view of FIG. 6A, the power and communication adapter 420 may be embedded within the second layer 604 between the first layer 602 and the third layer 606. In some aspects, the power and communication adapter 420 may include a lead wire 612 electrically couplable to a power supply (e.g., power supply 142 of FIG. 1). According to various aspects, the lead wire 612 may include a wire connector 614 electrically couplable to a vehicle (e.g., to a wiring harness of vehicle 102 of FIG. 1). The wire connector 614 may be universal to different trim levels of a particular vehicle make and model, different vehicle models of the same vehicle make, or a number of vehicle makes, models and/or trim levels. In other aspects, the power and communication adapter 420 may not include the lead wire 612 and/or the wire connector 614. In such aspects, the power and communication adapter 420 may be a power source or power module configured to power a plurality of electronic devices 136 of the vehicle body panel 400 independent of a separate vehicle-based power supply. FIG. 6A depicts the connector line 418H that couples the power and communication adapter 420 to the node 416 of FIG. 4. In view of FIG. 6A, the connector line 418 may be similarly embedded within the second layer 604 between the first layer 602 and the third layer 606. According to other aspects, the connector line 418 may be embedded within the first layer 602, positioned between the first layer 602 and the second layer 604, positioned between the second layer 604 and the third layer 606, embedded within the third layer 606, and/or the like.

FIG. 6B depicts a cross-sectional view along axis 6B-6B of the illustrative vehicle body panel 400 of FIG. 4, according to various aspects of the present disclosure. Referring to FIG. 6B, the ultrasound emitter and receiver 414 may be embedded within the first layer 602. In some aspects, as depicted in FIG. 6B, a first surface 616 (e.g., in the +x direction of the coordinate axes of FIG. 6B) of the ultrasound emitter and receiver 414 may be covered by a thickness "a" of first layer 602 material. In such aspects, the thickness "a" may be configured such that functionality of the ultrasound emitter and receiver 414 is not inhibited. According to various aspects, embedding the ultrasound emitter and receiver 414 within the first layer 602 behind (e.g., in the −x direction of the coordinate axes of FIG. 6B) the thickness "a" of first layer 602 material may prevent air-flow disturbances (e.g., surface drag) over the external surface 608 of the vehicle body panel 400. Additionally, in such an aspect, the ultrasound emitter and receiver 414 may be protected by the thickness "a" of the first layer 602 from environmental elements (e.g., rain, ice, dirt, and/or the like) that may otherwise contribute to premature failure. In other aspects, the first surface 616 of the ultrasound emitter and receiver 414 may not be covered by the thickness "a" of the first layer 602 material. In such aspects, the first surface 616 of the ultrasound emitter and receiver 414 may align with or protrude from the external surface 608 of the first layer 602. FIG. 6B further depicts the connector line 418G that couples the ultrasound emitter and receiver 414 to the node 416 and the connector line 418H that couples the power and communication adapter 420 to the node 416 of FIG. 4. In view of FIG. 6A, the connector line 418G may be similarly embedded within the second layer 604 between the first layer 602 and the third layer 606. According to other aspects, the connector line 418G may be embedded within the first layer 602, positioned between the first layer 602 and the second layer 604, positioned between the second layer 604 and the third layer 606, embedded within the third layer 606, and/or the like.

FIG. 6C depicts a cross-sectional view along axis 6C-6C of the illustrative vehicle body panel 400 of FIG. 4, according to various aspects of the present disclosure. Referring to FIG. 6C, the camera 410 may include a first portion 410A and a second portion 410B.

In view of FIG. 6C, the first portion 410A of the camera 410 may be embedded within the first layer 602, the second layer 604, and/or the third layer 606 of the vehicle body panel 400. According to various aspects, the first portion 410A may include one or more than one component (e.g., a basic structure, a minority of components, one or more than one non-moving component, and/or the like) of the camera 410. In one aspect, the first portion 410A may include the image sensor (e.g., CMOS). In some aspects, as depicted in FIG. 6C, a first surface 618 (e.g., in the +x direction of the coordinate axes of FIG. 6C) of the first portion 410A may be covered by a thickness "b" of first layer 602 material (e.g., a clear and/or transparent material). In such aspects, the thickness "b" may be configured such that functionality of the camera 410 is not inhibited. In some aspects the thickness "b" may assist camera functionality (e.g., to focus an image). As described, embedding the first portion 410A within the first layer 602 behind (e.g., in the −x direction of the coordinate axes of FIG. 6C) the thickness "b" of first layer 602 material may prevent air-flow disturbances (e.g., surface drag) over the external surface 608 of the vehicle body panel 400. Additionally, in such an aspect, the first portion 410A may be protected by the thickness "b" of the first layer 602 from environmental elements (e.g., rain, ice, dirt, and/or the like) that may otherwise contribute to premature failure. In other aspects, the first surface 618 of the first portion 410A may not be covered by the thickness "b" of the first layer 602 material. In such aspects, the first surface 618 of the first portion 410A may align with or protrude from the external surface 608 of the first layer 602. FIG. 6C further depicts the connector line 418E that couples the first portion 410A of the camera 410 to the node 416 and the connector line 418H that couples the power and communication adapter 420 to the node 416 of FIG. 4. In view of FIG. 6A, the connector line 418G may be similarly embedded within the second layer 604 between the first layer 602 and the third layer 606. According to other aspects, the connector line 418G may be embedded within the first layer 602, positioned between the first layer 602 and the second layer 604, positioned between the second layer 604 and the third layer 606, embedded within the third layer 606, and/or the like.

Still referring to FIG. 6C, the second portion 410B of the camera 410 may be coupled to a vehicle structure 620 (e.g., vehicle unibody, vehicle frame, and/or the like). According to various aspects, the second portion 410B may include one or more than one component (e.g., a core structure, a majority of components, one or more than one moving component, and/or the like) of the camera 410. In one aspect, the second portion 410B may include a camera motor. In view of FIG. 6C, the vehicle structure 620 may include a rigid structure configured to support the one or more than one component of the camera 410. In such aspects, the vehicle structure 620 relieves the vehicle body panel 400 from having to support all components of the camera 410. Accordingly, in some aspects, the vehicle body panel 400 may be configured to support (e.g., attachingly, structurally, and/or the like) one or more than one component of the camera 410 rather than all components of the camera 410 (e.g., a relatively more lightweight vehicle body panel 400). In other aspects, the vehicle body panel 400 may be configured to support (e.g., attachingly, structurally, and/ or the like) all components of the camera 410 (e.g., a relatively less lightweight vehicle body panel).

Referring still to FIG. 6C, a rear-facing end 622 (e.g., in the −x direction of the coordinate axes of FIG. 6C) of the first portion 410A of the camera 410 may be configured to interface with a forward-facing end 624 (e.g., in the +x direction) of the second portion 410B of the camera 410 and the forward-facing end 624 of the second portion 410B of the camera 410 may be configured to interface with the rear-facing end 622 of the first portion 410A of the camera 410. According to such aspects, the interface may mechanically and/or electrically couple the first portion 410A and the second portion 410B to form a complete, functional camera. The interface may further seal the first portion 410A and the second portion 410B. In some aspects, the second portion 410B of the camera 410 may include a lead wire 626 electrically couplable to a power supply (e.g., power supply 142 of FIG. 1). According to various aspects, the lead wire 626 may include a wire connector 628 electrically couplable to a vehicle (e.g., to a wiring harness of vehicle 102 of FIG. 1). In other aspects, the second portion 410B of the camera 410 may not include the lead wire 626 and/or the wire connector 628. In such aspects, the first portion 410A of the camera 410 may be electrically coupled to an independent power source or power module integrated or embedded within the vehicle body panel 400. In one aspect, referring briefly to FIG. 4, the first portion 410A may be electrically coupled to the power and communication adapter 420 (e.g., via connector line 418, node 416, and connector line 418H).

In light of FIG. 6C, any electronic device 136, as described herein (e.g. see FIG. 1), may include more than one portion. According to various aspects, a first portion of the electronic device 136 may be embedded within and/or between layers and/or integrated into a vehicle body panel 103. The first portion may include one or more than one component of the electronic device 136. In various aspects, the first portion may include a minority of the electronic device components. In other aspects, the first portion may include an equal or near equal percentage of electronic device components as a second portion. According to aspects described herein, the first portion may include a basic structure of the electronic device (e.g., a laser emitter). Such a "thin" first portion may facilitate a light-weight vehicle body panel 103 (e.g., body panel does not require mechanical strength to support a complete electronic device 136). In some aspects, the first portion may include one or more than one non-moving component. In other aspects, the first portion may include one or more than one non-moving component and one or more than one moving component. Further according to various aspects, a second portion of the electronic device 136 may be couplable to a vehicle structure (e.g., vehicle unibody, vehicle frame, and/or the like). The second portion may include one or more than one remaining component of the electronic device 136. In various aspects, the second portion may include a balance majority of the electronic device components. In other aspects, the second portion may include an equal or near equal percentage of electronic device components as the first portion. According to aspects described herein, the second portion may include a core structure of the electronic device. In some aspects, the second portion may include one or more than one remaining moving component. In other aspects, the second portion may include one or more than one remaining moving component as well as one or more than one remaining non-moving component.

Accordingly, in light of FIG. 6C, aspects of the present disclosure allow for modular replacement and/or upgrade one or more than one electronic device (e.g. a sensor) that support an advanced-feature functionality as described herein. According to some aspects, if a vehicle owner's vehicle is already equipped with the advanced-feature functionality but has a defective, malfunctioning, and/or obsolete electronic device 136, the vehicle owner may replace a vehicle body panel 103 including the first portion and/or the second portion coupled to the vehicle structure. Accordingly, the vehicle owner may only replace the defective, malfunctioning, and/or obsolete portion and may not have to replace the vehicle body panel 103 including the first portion or the second portion coupled to the vehicle structure. According to further aspects, if a vehicle owner's vehicle is not yet equipped with an advanced-feature functionality, the vehicle owner may install a vehicle body panel 103 including the first portion. In some aspects, if the second portion has already been coupled to the vehicle structure (e.g., pre-installed by the vehicle manufacturer) the vehicle owner may simply install the vehicle body panel 103 including the first portion by mechanically and/or electrically coupling the first portion and the second portion. Such a coupling may further seal the first portion and the second portion. In other aspects, if the second portion has not yet been coupled to the vehicle structure (e.g., not pre-installed by the vehicle manufacturer), the vehicle owner may install the second portion by coupling the second portion to the vehicle structure. In such aspects, the vehicle structure (e.g., vehicle unibody, vehicle frame, and/or the like) may be configured to accommodate the second portion. In some aspects, the vehicle structure may define a mounting location that corresponds to a location of the first portion on the vehicle body panel 103 when installed on the vehicle structure. Furthermore, the vehicle structure may define a space configured to receive the second portion at that mounting location. Still further, the vehicle structure may be pre-wired (e.g., a wiring harness and/or the like) at that mounting location to electrically couple the second portion to the vehicle. In some aspects of the present disclosure, such a mounting location, space, and/or pre-wiring may be the same across different trim levels of a particular vehicle make and model, different vehicle models of the same vehicle make, or a number of vehicle makes, models and/or trim levels. After installing the second portion, the vehicle owner may install the vehicle body panel 103 including the first portion by mechanically and/or electrically coupling the first portion and the second portion. Such a coupling may further seal the first portion and the second portion.

According to various aspects, to upgrade one or more than one electronic device 136, the vehicle body panel(s) 103 that support a desired advanced-feature functionality would be determined. Next, the original vehicle body panel(s) (e.g., not including the one or more than one electronic device 136, including an obsolete or outdated electronic device 136, and/or the like) would be removed. Next, the determined vehicle body panel(s) 103 would be installed. If the vehicle 102 is pre-wired for the one or more than one electronic device 136, a wire connector associated with the vehicle body panel(s) 103 (e.g., FIG. 6A, wire connector 614 of power and communication adapter 420) would be connected to the vehicle's 102 pre-wiring (e.g., wiring harness). If the vehicle body panel(s) 103 include a first portion of an electronic device 136, the first portion would be coupled to its second portion. If the second portion is installed (e.g., pre-installed) on the vehicle 102, the first portion would simply be coupled to its second portion to form a complete, functional electronic device 136. If the second portion is not installed on the vehicle 102, the second portion would be installed. If the vehicle 102 is pre-wired for the second portion, a wire connector associated with the second portion (e.g., FIG. 6C, wire connector 628) would be connected to the vehicle's 102 pre-wiring (e.g., wiring harness) and the first portion would be coupled to its second portion to form the complete, functional electronic device 136. If the vehicle 102 is not pre-wired for the one or more than one electronic device 136 (e.g., vehicle body panel(s) 103 including whole electronic devices 136 and/or vehicle body panel(s) 103 including first portions of electronic devices), the vehicle body panel(s) 103 may have an independent power source to power the electronic device(s) and the vehicle body panel(s) 103 would simply be installed. Next, if the vehicle 102 is pre-wired for the one or more than one electronic device, the vehicle control unit 140 may be updated (e.g., programmed) to realize the desired advanced-feature functionality. If the one or more than one electronic device uses a control system(s) 138, the control system(s) 138 may be installed (e.g., if not equipped) and/or updated (e.g., programmed) to realize the desired advanced-feature functionality. If the vehicle 102 is not pre-wired for the one or more than one electronic device 136, a central wireless node 146 may be installed for a wireless sub-node 422 of the vehicle body panel(s) 103 to communicate with the vehicle control unit 140 and/or wireless node(s) 144 of the control system(s) 138 to realize the desired advanced-feature functionality.

It should now be understood that the vehicle body panels 103 described herein are suitable for installing, replacing, and/or upgrading one or more than one electronic device, or a portion thereof, on a vehicle 102 to realize one or more than one desired advanced-feature functionality. In particular, each vehicle body panel 103 may include at least one electronic device 136 (e.g., a sensor), or a portion thereof, embedded and/or integrated therein. According to various aspects, a vehicle body panel 103 may include a universal body panel configured to be interchangeable with an original equipment manufacturer (OEM) body panel of multiple trim levels of a particular vehicle make and model, multiple vehicle models of a same vehicle make, or any vehicle make, model and/or trim level combination. According to further aspects, the vehicle body panel 103 may be configured for initial installation as well as for selective repositioning (e.g., decoupling and recoupling) along a vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle body panel, comprising:
   at least one layer of material defining the vehicle body panel; and
   one or more than one electronic device, wherein a portion of each electronic device is embedded within one or more than one of the at least one layer of material;
   wherein each electronic device communicates with a control system or a vehicle control unit of the vehicle to support an advanced-feature functionality of the vehicle; and
   wherein at least one electronic device comprises a first portion embedded within the one or more than one of the at least one layer of material, wherein the first portion is couplable to a second portion not embedded within the material, and wherein the first portion upon being coupled to the second portion communicates with the control system or the vehicle control unit of the vehicle to support the advanced-feature functionality of the vehicle.

2. The vehicle body panel of claim 1, wherein each electronic device comprises a sensor configured to support at least one advanced-feature functionality of the vehicle.

3. The vehicle body panel of claim 1, wherein the at least one layer of material includes a first layer of material and a second layer of material, and wherein the first portion of the at least one electronic device is embedded within one of the first layer of material or the second layer of material.

4. The vehicle body panel of claim 3, wherein the first portion of the at least one electronic device is embedded within the first layer of material a first thickness from an external surface of the vehicle body panel.

5. The vehicle body panel of claim 1, further comprising a node, wherein each electronic device is coupled to the node.

6. The vehicle body panel of claim 5, further comprising a communication adapter, wherein the node is coupled to the communication adapter for each electronic device to communicate with the control system or the vehicle control unit of the vehicle.

7. The vehicle body panel of claim 6, wherein the communication adapter is couplable to one or more than one control system via a wireless connection.

8. The vehicle body panel of claim 1, wherein the vehicle body panel is configured for installation on different trim levels of the vehicle's make and model, different models of the same make as the vehicle, or different makes, models and trim levels than the vehicle.

9. A vehicle body panel system, comprising:
   one or more than one control system, each control system supporting an advanced-feature functionality of a vehicle;
   at least one layer of material defining a vehicle body panel; and
   one or more than one electronic device, wherein a portion of each electronic device is embedded within one or more than one of the at least one layer of material;
   wherein each electronic device communicates with the one or more than one control system to support at least one advanced-feature functionality of the vehicle; and
   wherein at least one electronic device comprises a first portion embedded within the one or more than one of the at least one layer of material, wherein the first portion is couplable to a second portion not embedded within the material, and wherein the first portion upon being coupled to the second portion communicates with the one or more than one control system to support the at least one advanced-feature functionality of the vehicle.

10. The system of claim 9, wherein the first portion of the at least one electronic device is embedded within a single layer of the at least one layer of material.

11. The system of claim 9, further comprising a node and a communication adapter embedded within the one or more than one of the at least one layer of material, and wherein each electronic device is coupled to the communication adapter via the node to communicate with the one or more than one control system.

12. The system of claim 11, wherein the communication adapter is coupled to the one or more than one control system via a wireless connection.

13. The system of claim 12, wherein the communication adapter comprises a wireless sub-node.

14. The system of claim 13, wherein each control system comprises a wireless node configured to communicate with the wireless sub-node.

15. The system of claim 13, further comprising a central wireless node configured to communicate with the wireless sub-node.

16. A vehicle body panel system, comprising:
- a vehicle control unit supporting an advanced-feature functionality of a vehicle;
- at least one layer of material defining a vehicle body panel; and
- one or more than one electronic device, wherein a portion of each electronic device is embedded within one or more than one of the at least one layer of material;
- wherein each electronic device communicates with the vehicle control unit to support at least one advanced-feature functionality of the vehicle; and
- wherein at least one electronic device comprises a first portion embedded within the one or more than one of the at least one layer of material, wherein the first portion is couplable to a second portion not embedded within the material, and wherein the first portion upon being coupled to the second portion communicates with the vehicle control unit to support the at least one advanced-feature functionality of the vehicle.

17. The system of claim 16, wherein the first portion of the at least one electronic device is embedded within a single layer of the at least one layer of material.

18. The system of claim 16, further comprising a power and communication adapter embedded within the one or more than one of the at least one layer of material, and wherein each electronic device is coupled to the power and communication adapter to power each electronic device and to communicate with the vehicle control unit via a wireless connection.

19. The system of claim 18, wherein the power and communication adapter comprises a wireless sub-node.

20. The system of claim 19, further comprising a central wireless node configured to communicate with the wireless sub-node.

* * * * *